W. M. CONOVER.
SUPPORT FOR MOTOR CYCLES.
APPLICATION FILED FEB. 12, 1913
1,124,109.
Patented Jan. 5, 1915.
2 SHEETS—SHEET 1.
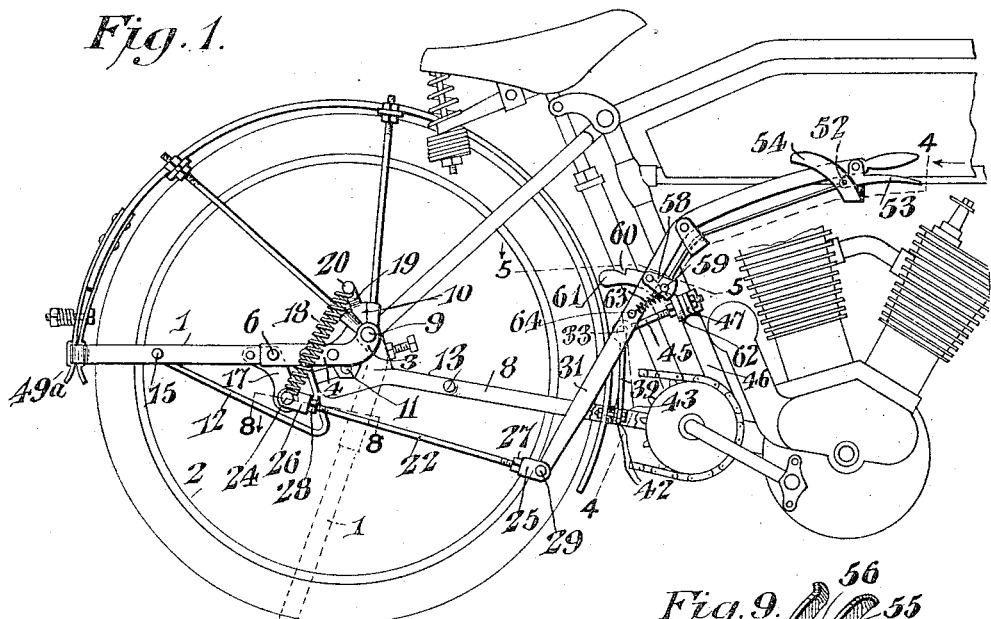
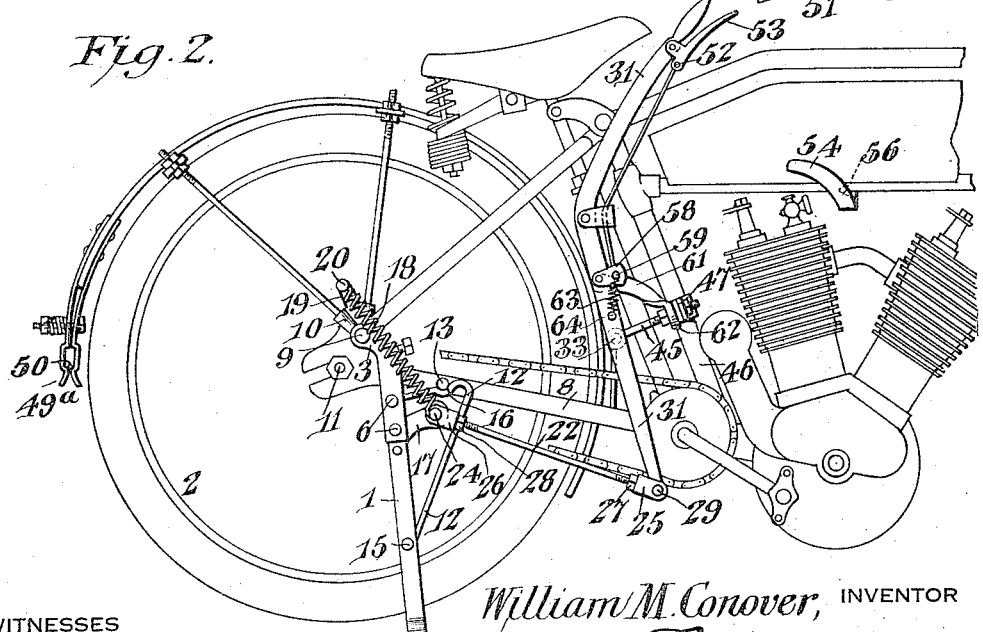
WITNESSES
William M. Conover, INVENTOR
BY
ATTORNEY W. M. CONOVER.
SUPPORT FOR MOTOR CYCLES.
APPLICATION FILED FEB. 12, 1913.
1,124,109.
Patented Jan. 5, 1915.
2 SHEETS—SHEET 2.
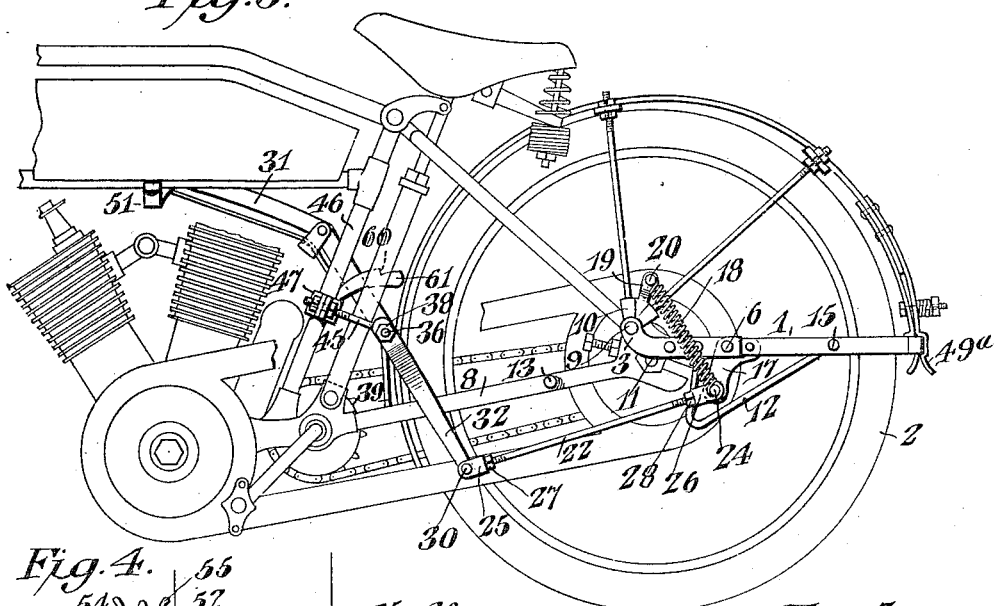
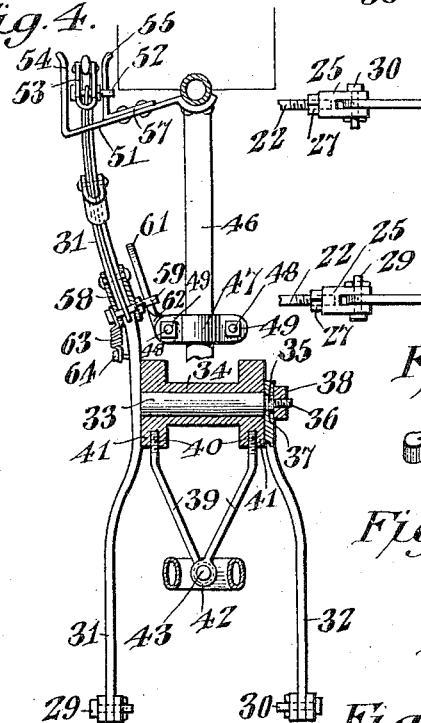
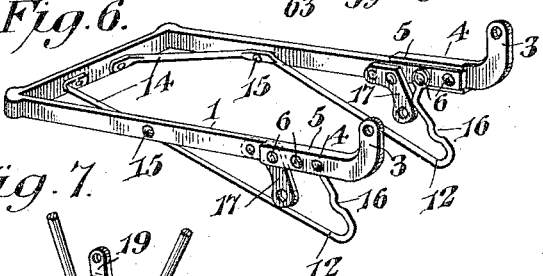
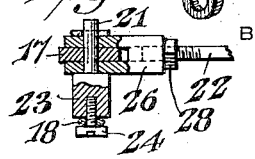
William M. Conover
INVENTOR
WITNESSES
BY
ATTORNEY

UNITED STATES PATENT OFFICE.

WILLIAM M. CONOVER, OF GETTYSBURG, PENNSYLVANIA, ASSIGNOR OF ONE-HALF TO HARRY A. SHEADS, OF GRAND FORKS, BRITISH COLUMBIA, CANADA.

SUPPORT FOR MOTOR-CYCLES.

1,124,109. Specification of Letters Patent. Patented Jan. 5, 1915.

Application filed February 12, 1913. Serial No. 747,969.

*To all whom it may concern:*

Be it known that I, WILLIAM M. CONOVER, a citizen of the United States, residing at Gettysburg, in the county of Adams and State of Pennsylvania, have invented a new and useful Support for Motor-Cycles, of which the following is a specification.

The invention relates to improvements in supports for motor cycles.

The object of the present invention is to improve the construction of supports for motor cycles, and to provide a simple and comparatively inexpensive support of strong and durable construction, adapted to be readily applied to a motor cycle, and capable of easy operation and of enabling a motor cycle to be raised and supported in an elevated position with less effort than heretofore.

A further object of the invention is to provide a motor cycle support equipped with means for positively locking it in a raised position to prevent it from accidentally dropping while a motor cycle is in motion, and for also locking the support in its operative position to enable the motor cycle to be left standing upon an inclined surface without danger of the support slipping and permitting the machine to fall.

The invention also has for its object to provide a motor cycle support, which will not interfere with the ready removal of the rear wheel for repairing a puncture or for any other purpose.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a side elevation of a motor cycle support, constructed in accordance with this invention and shown applied to a motor cycle, the pivoted stand being raised. Fig. 2 is a similar view, the stand being lowered for supporting the motor cycle. Fig. 3 is an elevation of the opposite side of the machine, the parts being arranged as shown in Fig. 1. Fig. 4 is a transverse sectional view on the line 4—4 of Fig. 1. Fig. 5 is a horizontal sectional view on the line 5—5 of Fig. 1. Fig. 6 is a detail perspective view of the stand. Fig. 7 is a detail perspective view of a portion of the mud guard support. Fig. 8 is a detail sectional view on the line 8—8 of Fig. 1. Fig. 9 is a detail perspective view of the front catch or keeper.

Like numerals of reference designate corresponding parts in all the figures of the drawings.

In the accompanying drawings in which is illustrated the preferred embodiment of the invention, 1 designates an approximately U-shaped stand composed of spaced sides and a transverse connecting portion and straddling the rear wheel 2 of a motor cycle in the usual manner, and adapted to swing downwardly from the elevated position illustrated in Figs. 1 and 3 of the drawings to that shown in Fig. 2 for supporting the rear wheel of the motor cycle clear of the ground and for maintaining the machine in an upright position. The stand 1 is provided at the inner or upper terminals of its sides with angularly disposed ears 3, extending from the sides approximately at right angles to the same and preferably constructed separate therefrom and provided with integral attaching portions 4 having inwardly extending parallel flanges 5, arranged to receive and embrace the sides of the stand. The ears, which consist of approximately L-shaped plates or pieces, are secured to the sides of the stand by rivets 6, or other suitable fastening devices, which pierce the side portions of the stand and the shank portions of the ears.

The terminal ears 3 of the stand are pivoted to the frame 8 of the motor cycle by bolts 9, which also secure mud guard supports 10 to the said frame 8. The bolts 9 are located above and in advance of the axle 11 of the rear wheel 2, and when the stand swings downwardly from the approximately horizontal position shown in Fig. 1, the transverse connecting foot portion approaches the tread of the wheel as it nears the ground, and when it strikes the ground, it is located well under the wheel and close to the tread thereof, approximately one half an inch from the same, as illustrated in dotted lines in Fig. 1 of the drawings, and it only requires a comparatively light pull to swing the motor cycle rearwardly on the stand and carry the latter from the dotted line position shown in Fig. 1 to the full line position illustrated in Fig. 2. This elevates the rear portion of the motor cycle and carries the pivot of the stand in rear of the vertical plane of the foot or center of support, the rearward movement of the machine being limited by forwardly extending loops 12, which engage with studs or projections 13 extending laterally from the frame of the motor cycle in advance of the axle of the rear wheel. In the movement of the stand from the dotted line position to its upright position, the foot or connecting portion of the stand moves away from the tread of the wheel, and it is approximately an inch and a half from the same when the loops 12 are in engagement with the projections or studs 13. The loops 12 are preferably formed integral with braces 14, constructed of rod metal and secured to the inner faces of the side portions of the stand at points intermediate of the ends of the said side portions by rivets 15, or other suitable fastening devices and extending downwardly or outwardly therefrom to the transverse connecting or foot portion of the stand to which the lower or outer terminals of the braces are secured. The loops, which are approximately V-shaped, have angularly disposed side portions. One side of each loop 12 is formed integral with and extends from the upper or inner end of the brace 14, and the other side of the loop 12 is secured to the adjacent side portion of the stand by one of the rivets 6. The loops 12 are provided with bends 16 forming seats to receive the studs or projections 13. The sides of the stand are also equipped with intermediate ears 17, preferably consisting of separate plates or pieces, riveted or otherwise secured to the sides of the stand at the inner faces thereof and extending downwardly therefrom when the stand is in a horizontal position. The ears 17 are located in rear of the pivot bolts of the stand when the latter is in its raised position, and coiled springs 18 are secured to the ears 17 and to ears 19, which extend upwardly from the mud guard supports 10, as clearly shown in Fig. 7 of the drawings. The ears 19, which are formed integral with the mud guard supports, receive bolts 20, or other suitable fastening means to which the upper ends of the coiled springs 18 are connected. The intermediate ears 17 of the stand receive pins 21 securing the rear terminals of the connecting rods 22 to the stand and provided at their outer ends with heads 23, having threaded sockets in their outer ends for the reception of screws 24 to which the lower ends of the coiled springs 18 are connected. When the stand is up and in a horizontal position, the coiled springs 18 are located in rear of the pivot bolts of the stand and assist in maintaining the said stand in such elevated position. When the stand is swung downward, the coiled springs are placed under tension and they are carried in advance of the pivot of the sides of the stand when the latter is in its operative position and is supporting the motor cycle, as shown in Fig. 2, whereby the springs also assist in maintaining the stand in such position. A slight movement of the stand carries the springs to a position in rear of the pivotal point of the stand and the springs will then assist in lifting the stand. They serve to partially counterbalance or sustain the weight of the stand and facilitate the easy operation of the same.

The connecting rods 22 have threaded terminals and are equipped with front and rear yokes 25 and 26, having threaded openings to adjustably receive the terminals of the connecting rods 22, and they are secured in their adjustment by lock nuts 27 and 28. The rear yokes 26 straddle the intermediate ears 17 of the stand and are pivoted to the same by the pins 21. The front yokes 25 are pivoted by bolts or pins 29 and 30 to the lower ends of an operating lever 31 and a side or arm 32 thereof, whereby when the operating lever is oscillated, the stand will be swung upwardly or downwardly according to the direction of movement of the operating lever. The operating lever, which is located at one side of the machine, is provided at points intermediate of its ends with an integral transverse pivot 33, mounted in a bearing 34 and extending across the machine at a point in advance of the rear wheel and having a reduced terminal provided with squared and threaded portions 35 and 36. The side or arm 32 is provided with a rectangular opening 37 to receive the squared portion 35 of the pivot, and it is secured thereon by a nut 38, which is arranged on the threaded portion 36 of the pivot and fitting against the side or arm 32 and the shoulder formed by reducing the pivot to provide the threaded terminal portion.

The bearing 34 is supported by lower braces 39 converging downwardly and having threaded upper terminals 40, which screw into threaded sockets or openings in terminal enlargements 41 of the bearing 34. The lower terminals of the braces 39 are provided with eyes 42, which are secured to a transverse portion of the frame of the machine by a bolt 43, or other suitable fastening device, which also fastens the front portion of the mud guard to the frame of the machine. The terminal enlargements 41, which are annular, are also provided at the front with threaded sockets for the reception of threaded rear terminals 44 of upper forwardly extending braces 45, which are connected at their front terminals with an upright portion 46 of the frame of the machine by a sectional clamp 47. The sections of the clamp have oppositely bowed portions to embrace the upright portion of the frame of the machine, and their terminal portions are pierced by the front ends of the braces 45, which are threaded at 48 for the reception of nuts 49, located in advance and in rear of the ends of the clamp and securing the sections thereof in engagement with the frame of the machine. The braces 39 and 45 consist of rods, and they firmly support the bearing for the operating lever. The operating lever is preferably provided at an intermediate point with a bend, the upper portion of the lever being arranged at a slight angle to the lower portion. The upper or front portion of the lever terminates in a suitable handle or grip, and the upper arm of the lever is adapted to be swung upwardly and rearwardly to disengage the stand from a spring clamp 49ª at the rear end of the mud guard. The spring clamp 49ª is of the ordinary construction, but the shoulders or portions 50, which engage the transverse connecting or foot portion of the stand, are rounded slightly to enable the stand to be readily disengaged from the spring clamp. This is possible for the reason that the stand does not depend on the spring clamp 49ª for retaining it in an elevated position, as the upper arm of the lever is held against movement by a fixed catch or keeper 51, which is engaged by a projection or pin 52 carried by a latch lever 53. The fixed catch or keeper 51 consists of a horizontal supporting arm and upwardly and rearwardly extending sides 54 and 55, spaced apart to receive the front portion of the lever between them. The supporting arm or portion is curved at its inner end to fit the frame of the machine and is secured to the same, and the outer upwardly extending side portion 54 is preferably formed integral with the arm. The inner side portion 55, which is provided with a notch 56 to form a shoulder for engaging with the pin or projection 52, is preferably constructed separate from the arm and is provided with an attaching portion 57, riveted or otherwise secured to the arm, as clearly illustrated in Fig. 9 of the drawings. The latch lever 53, which is pivoted to the operating lever adjacent to the grip or handle portion thereof, is adapted to be swung in the direction of the grip or handle to carry its projection 52 out of the notch 56. This will release the operating lever and permit the same to be oscillated. The operating lever is also locked when the stand is in its upright operative position, and for this purpose the operating lever is equipped with a movable catch consisting of a pivoted yoke 58, straddling the operating lever above the pivot thereof and provided with a projection or pin 59, which is adapted to engage in a notch 60 of a fixed catch or keeper 61, consisting of a plate or piece having an angularly bent terminal portion 62, pierced by one of the forwardly extending braces 45 and secured against the adjacent end of the sectional clamp 47 by the inner lock nut of such brace. The fixed catch or keeper extends upwardly and rearwardly from the sectional clamp, and the notch 60 is formed in the upper edge of the rear portion. The pin or projection 59 rides on the upper edge of the fixed catch or keeper and is adapted to drop into the notch, which forms a front shoulder for holding the upper portion of the arm or lever against forward movement. The projection 59 preferably consists of a pin or bolt piercing the yoke 58 and also connecting the upper end of a coiled spring 63 to the same. The spring is connected at its upper end to the yoke and extends downwardly therefrom to a stud or projection 64, and it is adapted to draw the yoke downwardly and maintain the projection in engagement with the notch of the fixed catch or keeper. By locking the stand in its upright position, the motor cycle may be left standing on an incline without liability of the stand slipping and permitting the machine to fall.

What is claimed is:—

1. A support of the class described including a rear stand, means for pivoting the same to a motor cycle at a point above and in advance of the rear wheel, said stand extending rearwardly from the pivotal point and located at the rear portion of the said wheel when not in use, and the said pivot being arranged so that when the stand is swung downwardly its outer portion or foot will approach the tread of the wheel and strike the ground close to the same, and mechanism operable from the seat of the motor cycle for oscillating the pivoted stand.

2. The combination with a motor cycle, of a mud guard secured to the frame of the motor cycle above and in advance of the axle of the rear wheel, an approximately U-shaped stand pivoted to the motor cycle, said stand extending rearwardly from the pivotal point around the rear portion of the rear wheel when not in use, and the pivotal point being arranged so that the stand in swinging downwardly and forwardly will approach the tread of the wheel and strike the ground close to the same, a lever mounted on the motor cycle and operable from the seat of the same, and connections between the lever and the stand for oscillating the latter.

3. The combination with a motor cycle, of a mud guard support secured to the frame of the motor cycle and provided with an upwardly extending ear, a stand pivoted to the mud guard support eccentrically of the rear wheel at a point above and in advance of the axle thereof and extending rearwardly from the pivotal point and located at the rear portion of the said wheel when not in use, said pivotal point being arranged so that the lower end of the stand in swinging downwardly and forwardly will approach the tread of the wheel and strike the ground close to the same, a lever mounted on the motor cycle and operable from the seat thereof, connections between the lever and the stand, and a coiled spring connected with the stand and with the ear of the mud guard and arranged to swing to opposite sides of the pivotal point of the stand to urge the said stand either forwardly or rearwardly.

4. The combination with a motor cycle, of a mud guard support secured to the frame of the motor cycle, a stand having an angularly disposed terminal ear and pivoted to the mud guard support and extending rearwardly from the pivotal point and located at the rear portion of the rear wheel when not in use, the pivotal point of the stand being arranged so that the lower end of the stand in swinging downwardly and forwardly will approach the tread of the wheel and strike the ground close to the same, said stand being also provided at an intermediate point with a projecting ear extending in the opposite direction from the terminal ear, a lever mounted on the motor cycle and operable from the seat thereof, and connections between the operating lever and the intermediate ear of the stand.

5. The combination with a motor cycle, of mud guard supports secured to the frame of the motor cycle and provided with upwardly extending ears, an approximately U-shaped stand pivoted to the mud guard supports and extending rearwardly from the pivotal point around the rear portion of the rear wheel when not in use and provided at opposite sides with projecting ears, a lever located at one side of the motor cycle and operable from the seat thereof and provided with a pivot mounted on and extending across the frame of the said motor cycle, an arm carried by the pivot, means for connecting the arm and the operating lever with the ears of the stand, and coiled springs secured to the ears of the mud guard supports and connected also with the ears of the stand and arranged to swing to opposite sides of the pivotal point of the stand for urging the latter either forwardly or rearwardly.

6. The combination with a motor cycle, of a stand pivotally mounted on the motor cycle, an operating lever provided with a pivot, a transverse bearing receiving the pivot, lower braces supporting the bearing and extending downwardly therefrom to the frame of the machine, upper braces extending forwardly from the bearing, a clamp connecting the forwardly extending braces and engaging the frame of the machine, and means for connecting the operating lever with the stand.

7. The combination with a motor cycle, of an operating lever mounted on the motor cycle frame in position to be operated from the seat, a fixed catch or keeper arranged in the path of the lever and located at the limit of the forward movement of the same, and means mounted on the lever and arranged to engage the fixed catch or keeper for locking the lever against movement in any direction.

8. The combination with a motor cycle, of a pivoted operating lever mounted on the motor cycle frame, fixed catches or keepers, a movable catch mounted on the operating lever and arranged to engage with one of the fixed catches or keepers to lock the lever in one position, and a latch lever carried by the operating lever and connected with the movable catch for operating the same and provided with means for engaging the other fixed catch or keeper to lock the operating lever in another position and against movement in any direction.

9. The combination with a motor cycle, of an operating lever having a transverse pivot, a bearing receiving the pivot and provided with forwardly extending braces, a clamp pierced by the braces and engaging the frame of the motor cycle, a fixed catch or keeper mounted on one of the braces contiguous to the clamp and extending rearwardly therefrom, a movable keeper carried by the operating lever and provided with means for engaging the fixed catch, and a latch lever mounted on the operating lever and connected with the movable catch.

10. The combination with a motor cycle, of an operating lever mounted on the motor cycle in position to be operated from the seat, a fixed catch or keeper mounted on the motor cycle frame and arranged to receive the operating lever at the limit of the forward movement thereof, said catch or keeper consisting of a supporting arm and spaced projecting portions, one of the projecting portions being provided with a notch, and means carried by the operating lever and arranged to engage the said notch for locking the lever in the fixed catch or keeper against movement in any direction.

In testimony, that I claim the foregoing as my own, I have hereto affixed my signature in the presence of two witnesses.

WILLIAM M. CONOVER.

Witnesses:
L. M. STEINOUR,
BERNARD M. PARTRIDGE.

Copies of this patent may be obtained for five cents each, by addressing the "Commissioner of Patents, Washington, D. C."